US006404803B1

(12) United States Patent
Wang et al.

(10) Patent No.: US 6,404,803 B1
(45) Date of Patent: Jun. 11, 2002

(54) PN CODE ACQUISITION WITH ADAPTIVE ANTENNA ARRAY AND ADAPTIVE THRESHOLD FOR CDMA WIRELESS COMMUNICATIONS

(75) Inventors: Bing Wang; Hyuck M. Kwon, both of Wichita, KS (US)

(73) Assignee: NeoReach, Inc., Rockville, MD (US)

( * ) Notice: Subject to any disclaimer, the term of this patent is extended or adjusted under 35 U.S.C. 154(b) by 0 days.

(21) Appl. No.: 09/694,280

(22) Filed: Oct. 24, 2000

(51) Int. Cl.$^7$ .......................... H04B 15/00; H04K 1/00; H04L 27/30

(52) U.S. Cl. ....................... 375/148; 375/144; 455/137; 455/303; 342/283

(58) Field of Search ................................. 375/140–145, 375/147, 148, 149, 150, 152, 232, 343, 346, 347; 455/132, 137, 303; 342/368, 378, 380, 381, 383, 384

(56) References Cited

U.S. PATENT DOCUMENTS

| | | | | |
|---|---|---|---|---|
| 4,528,674 A | * | 7/1985 | Sweeney et al. | 375/208 |
| 5,218,359 A | * | 6/1993 | Minamisono | 342/383 |
| 5,473,333 A | * | 12/1995 | Chiba et al. | 342/378 |
| 5,757,845 A | * | 5/1998 | Fukawa et al. | 375/200 |
| 5,844,951 A | * | 12/1998 | Proakis et al. | 375/347 |
| 5,999,800 A | | 12/1999 | Choi et al. | |
| 6,134,261 A | * | 10/2000 | Ryan | 375/141 |
| 6,160,839 A | * | 12/2000 | Zhang | 375/130 |
| 6,205,166 B1 | * | 3/2001 | Maruta et al. | 375/130 |

OTHER PUBLICATIONS

Tanaka, S., et al., "Pilot Symbol–Assisted Decision–Directed Coherent Adaptive Array Diversity for DS–CDMA Mobile Radio Reverse Link", IEICE Trans. Fundamentals, vol. E80, No. 12, pp. 2445–2454, 1997.

Adachi, F., et al., "Wideband DS–CDMA for Next–Generation Mobile Communications Systems", IEEE communications Magazine, vol. 36, No. 9, pp. 56–69, 1998.

3rd Generation Partnership Project, Technical Specification Group Radio Access Network; "Physical channels and mapping of transport channels onto physical channels (FDD)", 3GPP Technical Specification, TS 25.211, v3.2.0, 2000.

(List continued on next page.)

*Primary Examiner*—Chi Pham
*Assistant Examiner*—Phuong Phu
(74) *Attorney, Agent, or Firm*—Piper Rudnick, LLP; Steven B. Kelber (57) ABSTRACT

A pseudonise (PN) code acquisition scheme employs all elements of a smart antenna array and an adaptive threshold. The basic structure is the combination of a conventional PN correlation searcher, an adaptive beamformer, and an adaptive threshold setting circuit. During each observation interval, the adaptive beamformer adaptively updates the weight vector for the smart antenna elements using the accumulated received signal despread with trial PN code phase error as input, preferably at the chip rate. A spatially correlated signal is then formed by weighting an accumulated value of the signal received by each antenna in the array over the observation period with the corresponding final weight of smart antenna weight vector as calculated by the adaptive beamformer. This spatially correlated signal is then compared to a threshold to determine whether PN code acquisition has occurred. In preferred embodiments, an adaptive threshold setting algorithm is employed to adapt to varying environment for efficient PN code acquisition. The adaptive threshold setting circuit accumulates the signal received by each element over the observation period, multiplies the accumulated values by the updated weight vector and combines the weighted values to an average estimated power. The average estimated power is then employed to scale a fixed reference threshold to create the adaptive threshold.

56 Claims, 5 Drawing Sheets

OTHER PUBLICATIONS

3rd Generation Partnership Project, Technical Specification Group Radio Access Network; "Spreading and modulation (FDD)", 3GPP Technical Specification, TS25.213, v3.2.0, 2000.

3rd Generation Partnership Project; Technical Specification Group Radio AccessNetwork; "Physical layer procedures (FDD)", 3G TS 25.214 v3.2.0, 2000.

Choi, K. et al., "Adaptive PN Code Acquisition Using Instantaneous Power–Scaled Detection Threshold Under Rayleigh Fading and Gaussian Pulsed Jamming", The 4th CDMA International Conference Proceedings, vol. 11, pp. 162–169, Soul Korea, 1999.

Haykins, S., "Adaptive Filter Theory", 3rd Addition, Chapter 9, pp. 365–444, 1996.

* cited by examiner

PN CODE ACQUISITION WITH ADAPTIVE ANTENNA ARRAY AND ADAPTIVE THRESHOLD FOR CDMA WIRELESS COMMUNICATIONS

BACKGROUND OF THE INVENTION

1. Field of the Invention

The present invention relates to wireless telecommunications generally, and more particularly to the application of a smart antenna to PN code acquisition in a code division multiple access (CDMA) wireless communications system.

2. Description of the Related Art

In third generation (3G) wireless communications systems, particularly wide band (W)-CDMA systems such as those described in the 3rd Generation Partnership Project, "Physical Channels and Mapping of Transport Channels onto Physical Channels (FDD)," 3GPP Technical Specification, TS25.211, v3.2.0, March 2000; 3rd Generation Partnership Project, "Spreading and Modulation (FDD)," 3GPP Technical Specification, TS25.213, v3.2.0, March 2000; and 3rd Generation Partnership Project, "FDD: Physical Layer Procedures," 3GPP Technical Specification, TS25.214, v3.2.0, March 2000 (collectively "3GPP"), or in the CDMA2000 standard in TIA, Interim V&V Text for CDMA2000 Physical Layer (Revision 8.3), Mar. 16, 1999 ("TIA"), an option is to employ smart antenna technology in the base station. A smart antenna can suppress interfering signals from different direction of arrival angles (DOAs) from the desired users by using spatial diversity. Smart antenna technologies attract much attention these days as they support more users with a high quality of service and high data rates, up to 1.92 mega bits per second (Mbps). Examples of smart antennas and system architectures employing smart antennas may be found in commonly-owned co-pending U.S. application Ser. No. 09/610,470, filed Jul. 5, 2000, entitled "Smart Antenna with Adaptive Convergence Parameter;" Ser. No. 09/661,155, filed Sep. 13, 2000, entitled "Smart Antenna with No Phase Calibration for CDMA Reverse Link;" and Ser. No. 09/669,633, filed Sep. 26, 2000, entitled "New Cellular Architecture." The contents of all of these applications are hereby incorporated by reference herein.

Despite the interest in smart antenna technology generally, little attention has been paid to pseudonoise (PN) code acquisition in CDMA systems that employ a smart antenna at a base station. As used herein, PN code acquisition refers to a portion of a process referred to in the art as synchronization. Synchronization is generally regarded as encompassing two processes: PN code acquisition (in which a phase error for a known PN code is resolved to within a specified boundary—that is, a coarse PN phase code error correction), and PN code tracking, in which fine differences in PN phase code errors are detected and corrected. Thus, PN code acquisition, despite its misleading moniker, refers to a coarse correction for a PN phase error between a receiver and a transmitter (e.g., a base station and a mobile unit, or vice-versa), and does not refer to a process by which a PN code itself (as opposed to a PN code phase error) is detected.

PN code acquisition may be difficult when the smart antenna weight vector does not correspond to the desired signal's DOA (because the smart antenna will suppress signals from other DOAs). Because of this potential problem, existing systems use only one (omnidirectional) element output out of the M array elements for PN acquisition purposes. See F. Adachi, M. Sawahashi, and H. Suda, "Wideband DS-CDMA for Next-Generation Mobile Communications Systems," IEEE Communications Magazine, pp. 56–69, September 1998 ("Adachi et al."). Thus, the benefit of a smart antenna (e.g., the potential gain of the smart antenna) has not been used for PN code acquisition. This causes another problem as the mobile units in the system may transmit signals with low power because of the expected high smart antenna gain at a base station, with the result that the received signal-to-interference-plus-noise-ratio (SINR) at a base station may not be sufficient for PN code acquisition when only one element is employed.

BRIEF SUMMARY OF THE INVENTION

The present invention is an efficient PN code acquisition scheme which employs multiple elements of an antenna array and an adaptive threshold. The invention is particularly useful for CDMA wireless communications, especially for Direct Sequence (DS-)CDMA wireless communications. The basic structure of preferred embodiments is the combination of a conventional PN correlation searcher, an adaptive beamformer, and an adaptive threshold setting circuit. During each observation interval, which consists of multiple chips, the adaptive beamformer adaptively updates the weight vector for the smart antenna elements (as used herein, a smart antenna element refers to a single antenna, such as an omnidirectional antenna, in an array of antennas that collectively form the smart antenna) using the accumulated received signal despread with trial PN code phase error as input, preferably at the chip rate. The adaptive beam former may use any one of a number of algorithms for this purpose. In a preferred embodiment, a normalized least mean square algorithm is used. A spatially correlated signal is then formed by weighting an accumulated value of the signal received by each antenna in the array over the observation period with the corresponding final weight of smart antenna weight vector as calculated by the adaptive beamformer algorithm. This spatially correlated signal is then compared to a threshold to determine whether PN code acquisition has occurred. If the threshold is exceeded, PN code acquisition is declared. Otherwise, a new trial PN code phase error is selected and the process is repeated.

In conventional serial search algorithms, the above-mentioned threshold for PN code acquisition has been fixed and can be calculated from a given false alarm probability $P_f$ and a given bit-energy-to-interference power spectral density ratio $E_b/I_o$. But in a real mobile fading environment, $E_b/I_o$ often varies. In preferred embodiments, an adaptive threshold setting algorithm is employed to adapt to varying environment for efficient PN code acquisition. An adaptive threshold setting algorithm has been analyzed for a receiver with a single antenna element, in Kwonhue Choi, Kyungwhoon Cheun, and Kwanggeog Lee, "Adaptive PN code Acquisition Using Instantaneous Power-Scaled Detection Threshold Under Rayleigh Fading and Gaussian Pulsed Jamming," The $4^{th}$ CDMA International Conference, Proceedings Vol. II pp. 162–169, Seoul, Korea, Sep. 8–11, 1999 ("Choi et al."), the contents of which are hereby incorporated herein by reference. The present invention develops an adaptive threshold setting algorithm for a receiver with multiple array elements. The adaptive threshold setting circuit is actually an average power estimator in preferred embodiments. While the adaptive beamformer updates the weight vector $\underline{w}(i)$ adaptively, the power estimator estimates the instantaneous received signal and interference power prior to PN code despreading for each observation interval of $NT_c$ seconds. The average estimated power is then employed to scale a fixed reference threshold to create the above-mentioned adaptive threshold used to determine whether or not PN code acquisition has been achieved. The PN code acquisition time with the proposed PN code acquisition scheme with M=5 elements, by way of example, can be 210% shorter at a given SINR than the PN code acquisition time for a system, such as the system described in Adachi et al., in which only a single element is used for PN code acquisition.

In one aspect of the present invention, the PN code acquisition system may be applied to a base station, wherein the antennas are in the base station. According to another aspect of the present invention, the system is applied to a mobile station, wherein the smart antennas are in the mobile station.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

In the following detailed description, many specific details, such as chip rates and numbers of elements in smart antenna arrays, are provided by way of example in order to provide a thorough understanding of the present invention. The details discussed in connection with the preferred embodiments should not be understood to limit the present invention.

The present invention is described below in the context of a reverse link from a mobile to a base station in a CDMA wireless communications system. However, the invention is equally applicable to forward link PN code acquisition. The invention is also believed to be particularly applicable to Direct Sequence CDMA (DS-CDMA) systems, and thus will be discussed in the context of the same herein, but should not be understood to be limited to DS-CDMA systems.

Figure 1:
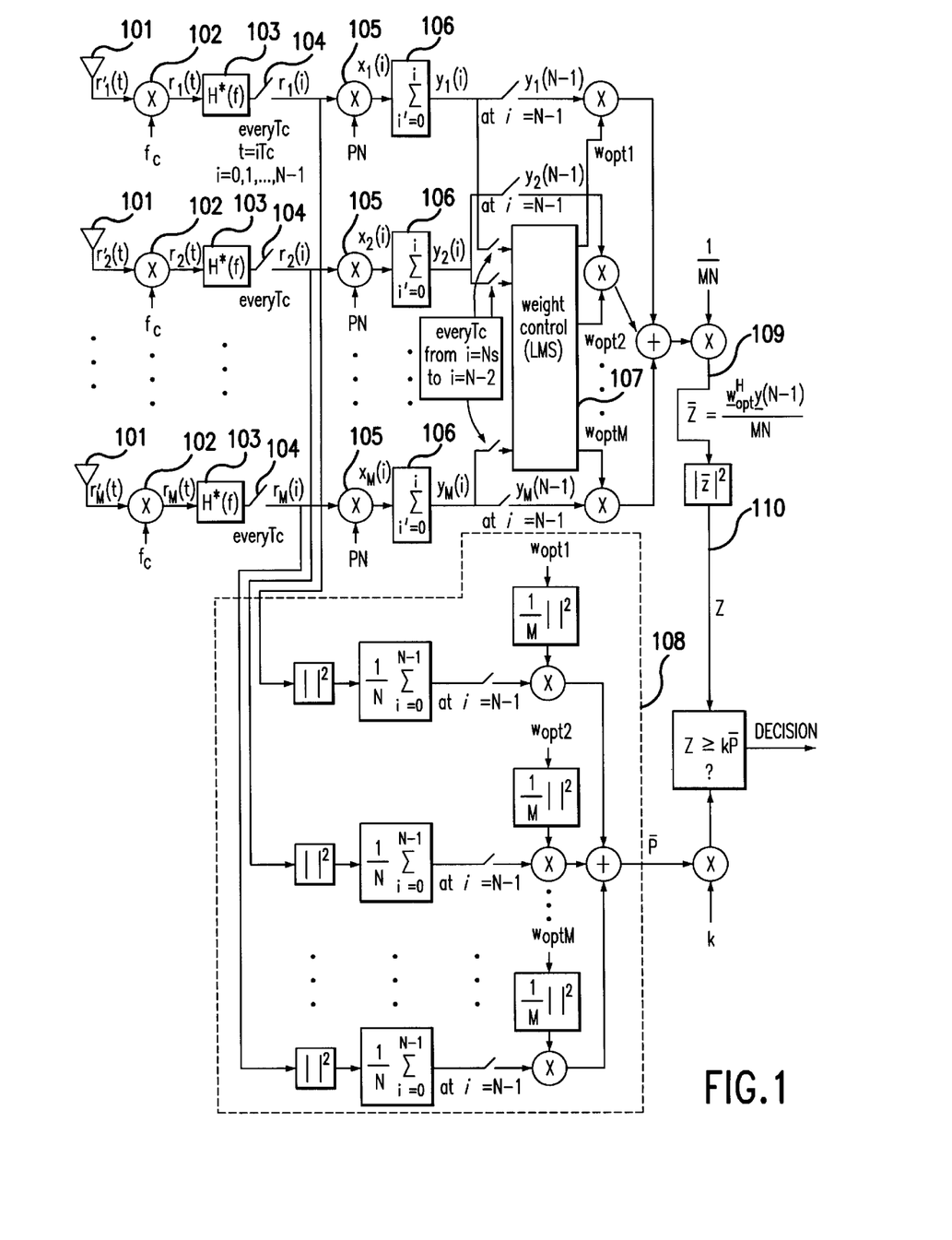
FIG. 1 shows a block diagram of a proposed PN code acquisition scheme for a DS-CDMA system configured in accordance with one embodiment of the present invention.

FIG. 1 shows a block diagram of the proposed PN code acquisition scheme for a DS-CDMA system configured in accordance with one embodiment of the present invention. The input signal r'(t) received from the each element 101 of the smart antenna array is passed through a demodulator 102 and a matched filter 103. The output of each matched filter 103 is sampled at the chip rate by a chip sampler 104, and correlated (despread) with the trial PN code phase error by a correlator 105. The output of the correlators 105 is stored by accumulators 106. The output of the accumulators 106 is used by an update process for the smart antenna weight vector.

In preferred embodiments, the weight vector of the smart antenna is updated with an LMS algorithm. In highly preferred embodiments, the normalized least mean square (LMS) algorithm described in S. Haykin, *Adaptive filter Theory*, 3rd Edition, Prentice Hall, Upper Saddle River, N.J., 1996 ("Haykin"), is employed to update the weight vector. Other vector update algorithms are also possible, including those algorithms discussed in commonly assigned co-pending U.S. application Ser. 09/610,470, filed Jul. 5, 2000, entitled "Smart Antenna with Adaptive Convergence Parameter." It is not necessary for the vector update to be an LMS algorithm. During each observation interval of $NT_c$ (where $T_c$ is the chip period and N is the number of chip periods in an observation interval) seconds, an adaptive beamformer 107 updates the weight vector $\underline{w}(i)$ adaptively, preferably at the chip rate. The input to adaptive beamformer 107 is the accumulator 106 output after despreading using the trial PN code phase error as described above.

In preferred embodiments, the vector update process starts after the observation interval begins. This is done in order to conserve processing power. The sample time index $i=N_s$ (where i is the chip or sample time index) on which the update starts is chosen to reflect the time required for the adaptive algorithm to converge. For example, in preferred embodiments using the normalized LMS algorithm described above and in which the number of chips N in the observation period is equal to 256, $N_s$ is chosen as 192, which provides for 256−192=64 iterations of the algorithm. This reflects that fact that the algorithm typically takes approximately 40 iterations to converge and includes a safety factor.

The update process ends at i=N−2 for the first observation interval. The last weight vector $\underline{w}(N-1)$ calculated by the update algorithm in an observation interval, which can be regarded as a best weight vector $\underline{w}_{opt}$, is used to generate an antenna array spatial correlation output $\bar{z}$ with the last accumulation output at i=N−1. The square of $\bar{z}$ is then compared to an adaptive threshold (discussed in further detail below) to determine whether PN code acquisition has been achieved. If the threshold is exceeded, the PN code has been acquired and the process ends. Otherwise, a new trial PN code phase error is selected and the algorithm is repeated. The weight vector adaptation is performed at each successive observation interval of $NT_c$ seconds until PN code acquisition is achieved.

The preferred LMS algorithm takes only 5M computations per chip period, where M is the number of the antenna array elements 101. The update rate can be sufficiently small such as a chip rate of 1.2288 Mcps. The present invention employs preferably all array elements 101 of an array for a PN correlation searcher while only one element is employed in the existing literatures ("Adachi et al.").

The following discussion explains the above-described process in greater detail. The array antenna elements 101 are assumed to be substantially identical and have the same response to any direction and the antenna spacing is one half of the carrier wavelength. The array response vector can be written as $$\underline{a}_o(\theta)=[1e^{-j\pi\,sin\,\theta}\ldots e^{-j\pi(M-1)sin\,\theta}]^T \qquad (1)$$

where θ is the DOA from the desired user signal, and T denotes the transpose. The received signal at the m-th element can be written as $$r'_m(t)=\sqrt{2P}\alpha(t)b(t-\tau T_c)c(t-\tau T_c)e^{j(w_ct+\psi_m)}e^{j\phi(t)}e^{-j\pi(m-1)sin\,\theta}+n_{m,BPF}(t) \qquad (2)$$

where P is the received signal power, α(t) and φ(t) are the fading amplitude and phase, respectively, b(t) is information data, c(t) is the PN spreading sequence, $w_c$ and $\psi_m$ are the angular carrier frequency and phase, respectively, $T_c$ is a chip interval, and τ is a PN code phase offset from a reference, which is assumed to be a random integer uniformly distributed between 0 and PN sequence period L. The $n_{m,BPF}(t)$ in equation (2) represents an additive white Gaussian noise (AWGN) bandpass interference plus noise signal. A fading channel with a single path is assumed for simplicity. The present invention can be applied for a multipath channel also. A simplified search, which shifts the trial PN code sequence by $T_c$, is considered here for simplicity. The phase of the PN code can be shifted in a fraction of chip interval in a complete search and it takes long simulation time. A single dwell is assumed for simplicity. The invention can be applied for a complete and multi-dwell PN code searches also. The PN spreading sequence c(t) is written as $$c(t)=\sum_i c(i)\prod_{T_c}(t-iT_c) \qquad (3)$$

where $c(i)\in\{1,-1\}$ with equal probability, $\Pi_{T_c}$ is a rectangular shape pulse with unit amplitude and duration $T_c$. The carrier synchronization is not assumed because noncoherent PN code single dwell serial search is employed. Also, assume a pilot channel is used instead of pilot symbols, i.e., b(t)=1 for all time as the pilot channel in cdma2000. Then, the equivalent baseband signal $r_m(t)$ at the m-th element after down-conversion with carrier frequency can be written as $$r_m(t)=\sqrt{P}\alpha(t)c(t-\tau T_c)e^{j[\Phi_m+\psi(t)-\pi(m-1)sin\,\theta]}+n_m(t) \qquad (4)$$

where $n_m(t)=n_m^1(t)+jn_m^Q(t)$ is a complex AWGN with mean zero and variance $I_0$. The output of matched filter H*(f) 103 is sampled at chip rate and the samples $r_m(i)$ are written as $$r_m(i)=\sqrt{E_c}\alpha(i)c(i-\tau)e^{j[\psi_m+\phi(i)-\pi(m-1)sin\,\theta]}+n_m(i) \qquad (5)$$

where i and $E_c$ denote the chip index and chip energy, respectively. After correlating with the local PN code at 105, $r_m(i)$ becomes $$x_m(i)=[\sqrt{E_c}\alpha(i)c(i-\tau)e^{j\phi_m(i)}+n_m(i)]c(i-\hat{\tau}) \qquad (6)$$

where $\hat{\tau}$ is the estimated PN code phase and $$\phi_m(i)=\psi_m+\phi(i)-\pi(m-1)sin\,\theta \qquad (7)$$

All antenna element outputs can be written in a vector form as $$\underline{x}(i)=[\sqrt{E_c}\alpha(i)c(i-\tau)\underline{a}(\phi)+\underline{n}(i)]c(i-\hat{\tau}) \qquad (8)$$

where $$\underline{a}(\phi)=[e^{j\phi_1(i)}e^{j\phi_2(i)}\ldots e^{j\phi_M(i)}]^T \qquad (9)$$

can be regarded as a modified array response vector, compared with $\underline{a}_0(\theta)$ in equation (1). Assume an observation interval of $NT_c$ for a PN code phase shift. Energy is accumulated every chip at each branch after PN despreading 105. The accumulator 106 output at $iT_c$ for the m-th branch can be written as $$y_m(i)=\sum_{i'=0}^{i}x_m(i') \qquad (10)$$

where i=0, 1, . . . , N−1 for the first observation interval, and m=1, 2, . . . , M. The adaptive beamformer 107 preferably starts updating weight vector $\underline{w}(i)$ adaptively at $i=N_s$ and ends updating at i=N−2 for the first observation interval. (Those of skill in the art will recognize that it is also possible to begin updating earlier or later, even as early as the start of the observation interval.) The same process is applied for the other observation intervals until PN code is acquired. The normalized LMS algorithm is employed to update the weight vector. This weight vector adaptation is performed every observation interval of $NT_c$ seconds. The input to the adaptive beamformer 107 is written as $$\underline{y}(i)=[y_1(i)y_2(i)\ldots y_M(i)]^T. \qquad (11)$$

The last weight vector $\underline{w}(N-1)$ in an observation interval, which can be regarded as a best weight vector $\underline{w}_{opt}$, is used to generate a spatial correlation output $\bar{z}$ with the last accumulation output $\underline{y}(N-1)$. The antenna array spatial correlation output $\bar{z}$ 109 can be written as $$\bar{z}=\underline{w}^H(N-1)\underline{y}(N-1)/(MN) \qquad (12)$$
$$=\frac{1}{MN}\sum_{m=1}^{M}\sum_{i=0}^{N-1}[w_{optm}x_m(i)]$$
$$=\frac{1}{MN}\sum_{j=1}^{MN}z_j,$$

where H stands for Hermitian, i.e., conjugate and transpose, $$\underline{w}(N-1)=\underline{w}_{opt}=[w_{opt1}w_{opt2}\ldots w_{optM}]^H, \qquad (13)$$

and $$z_j=w_{optm}x_m(i), j=(m-1)N+i+1. \qquad (14)$$

The final decision variable Z 110 is normalized and written as $$Z=|\bar{z}|^2=\left|\frac{1}{MN}\sum_{j=1}^{MN}z_j\right|^2. \qquad (15)$$

As discussed above, this final decision variable Z is then compared to a threshold, preferably an adaptive threshold as calculated by an adaptive threshold setting circuit 108, in order to determine whether PN code acquisition has been achieved. In preferred embodiments, the adaptive threshold setting circuit 108 estimates the average power during each observation interval $NT_c$. Referring to FIG. 1 and considering $|r_m(i)|^2=x_m(i)|^2$, we can get the average power $\bar{P}$ as $$\bar{P} = \sum_{m=1}^{M}\left\{\left[\frac{1}{M}|w_{optm}|^2\right]\cdot\left[\frac{1}{N}\sum_{i=0}^{N-1}|r_m(i)|^2\right]\right\} \quad (16)$$

$$= \frac{1}{MN}\sum_{m=1}^{M}\sum_{i=0}^{N-1}|w_{optm}x_m(i)|^2$$

$$= \frac{1}{MN}\sum_{j=1}^{MN}|z_j|^2.$$

If Z is larger than a scaled threshold $k\cdot\bar{P}$, a PN code acquisition is declared and the tracking loop is triggered for a single dwell serial search, where k is the fixed reference threshold. Otherwise, the acquisition scheme shifts the locally generated PN code phase (i.e., creates a new trial PN code phase error), and the searcher continues until a correct PN code phase is claimed (i.e., PN code acquisition is achieved).

The probability of Z being greater than $k\cdot\bar{P}$ is given as $$P_r\{Z>k\cdot\bar{P}\} = P_r\left\{\left|\frac{1}{MN}\sum_{j=1}^{MN}z_j\right|^2 > \frac{k}{MN}\sum_{j=1}^{MN}|z_j|^2\right\}. \quad (17)$$

To ease the derivation of the false alarm probability $P_f$ and detection probability $P_d$ later, we rewrite equation (17) using new decision variables U and V as $$P_r\{Z>k\bar{P}\} = P_r\{U>V\} \quad (18)$$

with $$U = (1-k)MN|\bar{z}|^2, \quad (19)$$

$$V = k(MN-1)\bar{v}_z, \quad (20)$$

where $\bar{z}$ is the sample mean of $z_j$ given in equation (12), and $\bar{v}_z$ denotes the sample variance of $z_j$ given as $$\bar{v}_z = \frac{1}{MN-1}\sum_{j=1}^{MN}|z_j - \bar{z}|^2. \quad (21)$$

Under hypothesis $H_1$ when the received PN code and the local PN code are aligned with the same phase, equation (18) gives the detection probability $P_d$, and under hypothesis $H_0$ when PN codes are out of phase, equation (18) gives the false alarm probability $P_f$ as follows:

$$P_d = P_r\{U>V|H_1\}, \quad (22)$$

$$P_f = P_r\{U>V|H_0\}. \quad (23)$$

From equations (19) and (20), we observe that both $P_d$ and $P_f$ are equal to 1 when k<0 and both equal to 0 when k>1. So we focus on the range of k between 0 and 1 in this invention.

The following is the theoretical analysis. Assume a slow Rayleigh fading channel so that the amplitude $\alpha(i)$ as well as the phase $\phi(i)$ remain constant over each observation time $NT_c$ but are independent between the observation intervals. Then $\alpha(i)$ and $\phi(i)$ can be written as $$\alpha(i) = \alpha,\ 0 \leq i \leq N-1, \quad (24)$$

$$\phi(i) = \phi,\ 0 \leq i \leq N-1, \quad (25)$$

for the first observation interval, where $\alpha$ and $\phi$ are constants. Therefore, (7) becomes $$\phi_m(i) = \psi_m + \phi - \pi(m-1)\sin\theta = \phi_m,\ 0 \leq i \leq N-1, \quad (26)$$

for the first observation interval, where $\phi_m$ is constant.

(1) When PN Code is Synchronized

This case means $$c(i-\tau) = c(i-\hat{\tau}). \quad (27)$$

For a theoretical analysis, we apply perfect weight vector $\underline{w}_{pft}$ equal to the modified array vector in equation (9) to obtain an ideal performance when PN code is synchronized. In other words, we assume that the smart antenna can track the DOA of the desired user signal perfectly as $$\underline{w}_{pft} = \underline{a}(\phi) \quad (28)$$

during the end period of an observation interval, $N_s \leq i \leq N-1$, when PN code is synchronized. In practice, a smart antenna cannot track perfectly the DOA of the desired user. The ideal case in equation (28) provides an upper and a lower bound of detection probability $P_d$ and average acquisition time $T_{acq}$, respectively. Equation (28) implies $$w_{opt,m} = w_{pft,m}^* = e^{-j\Phi_m},\ 1 \leq m \leq M. \quad (29)$$

Substituting equations (6), (27) and (29) into (14), we have $$z_j = \sqrt{E_c}\alpha + n_j,\ j = (m-1)N+i+1, \quad (30)$$

where $n_j = e^{-j\Phi_m}n_m(i)c(i-\hat{\tau})$, which can be easily shown to be a complex AWGN variable with zero mean and variance equal to $I_0$. Substituting equation (30) into equation (12), we get the sample mean $$\bar{z} = \sqrt{E_c}\alpha + \bar{n}, \quad (31)$$

where $$\bar{n} = \frac{1}{MN}\sum_{j=1}^{MN}n_j$$

is a complex AWGN variable with zero mean and variance equal to $I_0/MN$. Substituting equations (30) and (31) into equations (19) and (20), we have $$U = (1-k)MN|\sqrt{E_c}\alpha + \bar{n}|^2, \quad (32)$$

$$V = k(MN-1)\bar{v}_n, \quad (33)$$

where $$\bar{v}_n = \frac{1}{MN-1}\sum_{j=1}^{MN}|n_j - \bar{n}|,$$

is the sample variance of $n_j$. From equation (32), we can show the decision variable U has the non-central chi-square distribution 20 with its conditional probability density function as $$p_{U|\alpha}(u|\alpha) = \frac{\exp\{-[u+(1-k)MNE_c\alpha^2]/[(1-k)I_0]\}}{(1-k)I_0} \quad (34)$$

$$I_0\left(\frac{2\sqrt{(1-k)MNE_c\alpha^2 u}}{(1-k)I_0}\right),\ u \geq 0,$$

where $I_0(x)$ is the zero-th order modified Bessel function of the first kind, and $\alpha$ is Rayleigh-distributed with its probability density function as $$p(\alpha) = \frac{2\alpha}{\sigma_f^2} e^{-\alpha^2/\sigma_f^2} \quad (35)$$

where $\sigma_f^2$ is the average fading channel power. The probability density function (pdf) of U under synchronization is $$p_{UI}(u) = \int_0^\infty p_{UI}(u|\alpha)p(\alpha)d\alpha = \frac{\exp(-u/\beta)}{\beta}, u \geq 0, \quad (36)$$

where $$\beta=(1-k)(MNE_c\sigma_f^2+I_0). \quad (37)$$

From equation (33), we can show the decision variable V has the central chi-square distribution with 2(MN-1) degrees of freedom with its probability density function as below:

$$p_{VI}(v) = \frac{v^{(MN-2)}\exp[-v/(2\sigma^2)]}{\sigma^{2(MN-1)}2^{(MN-1)}\Gamma(MN-1)}, v \geq 0, \quad (38)$$

where $$\sigma^2=kI_0/2. \quad (39)$$

From equations (32) and (33), we know U and V are statistically independent because sample mean and sample variance are statistically independent when sampled from a Gaussian distribution. Then the detection probability can be derived to be $$P_d = P_r\{U > V | H_1\} = \left[\frac{\beta}{\beta + 2\sigma^2}\right]^{MN-1} \quad (40)$$

$$= \left[\frac{(1-k)(MNE_c\sigma_f^2 + I_0)}{(1-k)MNE_c\sigma_f^2 + I_0}\right]^{MN-1}.$$

(2) When PN Code is not Synchronized

This case means $$c(i-\tau) \neq c(i-\hat{\tau}). \quad (41)$$

Assume the beamforming direction of smart antenna is different from the DOA of the desired user signal. This is true in general when the PN code is not synchronized. Assume that the weight vector can be written as $$\underline{w}_{opt}=\underline{w}(N-1)=\underline{a}(\eta)=[e^{j\eta_1}e^{j\eta_2} \ldots e^{j\eta_M}]^T \neq \underline{a}(\phi) \quad (42)$$

without loss of generality. Equation (40) implies $$w_{optm}=e^{-j\eta_m} \neq e^{-j\phi_m}, 1 \leq m \leq M. \quad (43)$$

Substituting equations (6), (41) and (43) into equation (14), we have $$z_j=\sqrt{E_c}\alpha c(i-\tau)c(i-\hat{\tau})e^{j(\phi^{m-\eta_m})}+e^{-j\eta_m}n_m(i)c(i-\hat{\tau}). \quad (44)$$

We can show $z_j$ is a complex AWGN variable $n_0$ with zero mean and variance equal to $(E_c\sigma_f^2+I_0)$. Equation (44) can be rewritten as $$z_j=n_0. \quad (45)$$

Substituting equation (45) into equation (12), we have $$\bar{z} = \frac{1}{MN}\sum_{j=1}^{MN} n_0 = \bar{n}_0, \quad (46)$$

which is also a complex AWGN variable with zero mean and variance equal to $(E_c\sigma_f^2+I_0)/(MN)$. Substituting equations (45) and (46) into equations (19) and (20), we have $$U=(1-k)MN|\bar{n}_0|^2, \quad (47)$$

$$V=k(MN-1)\bar{v}_{n_0}, \quad (48)$$

where $$\bar{v}_{n_0} = \frac{1}{MN-1}\sum_{j=1}^{MN}|n_0 - \bar{n}_0|$$

is the sample variance of $n_0$. Similarly as subsection (1), we can show the decision variables U and V follow central chi-square distribution with 2 and 2(MN-1) degrees of freedom, respectively, and their probability density function are given as below $$p_{UO}(u) = \frac{\exp(-u/\beta)}{\beta}, \quad u \geq 0, \quad (49)$$

$$p_{VO}(v) = \frac{v^{(MN-2)}\exp[-v/(2\sigma^2)]}{\sigma^{2(MN-1)}2^{(MN-1)}\Gamma(MN-1)}, v \geq 0, \quad (50)$$

where $$\beta=(1-k)(E_c\sigma_f^2+I_0), \quad (51)$$

$$\sigma^2=k(E_c\sigma_f^2+I_0)/2. \quad (52)$$

Similarly as subsection (1), we also know U and V are statistically independent from equations (47) and (48), due to the fact that sample mean and sample variance are statistically independent when sampled from a Gaussian distribution. Then the false alarm probability can be derived to be $$P_f = P_r\{U > V | H_0\} = \left[\frac{\beta}{\beta + 2\sigma^2}\right]^{MN-1} \quad (53)$$

$$= (1-k)^{MN-1}.$$

We observe that the false alarm probability $P_f$ is a function of k, M and N only and does not depend on $E_c$ and $I_0$. Thus the adaptive threshold algorithm can approximately achieve a constant false alarm rate (CFAR).

Figure 2:
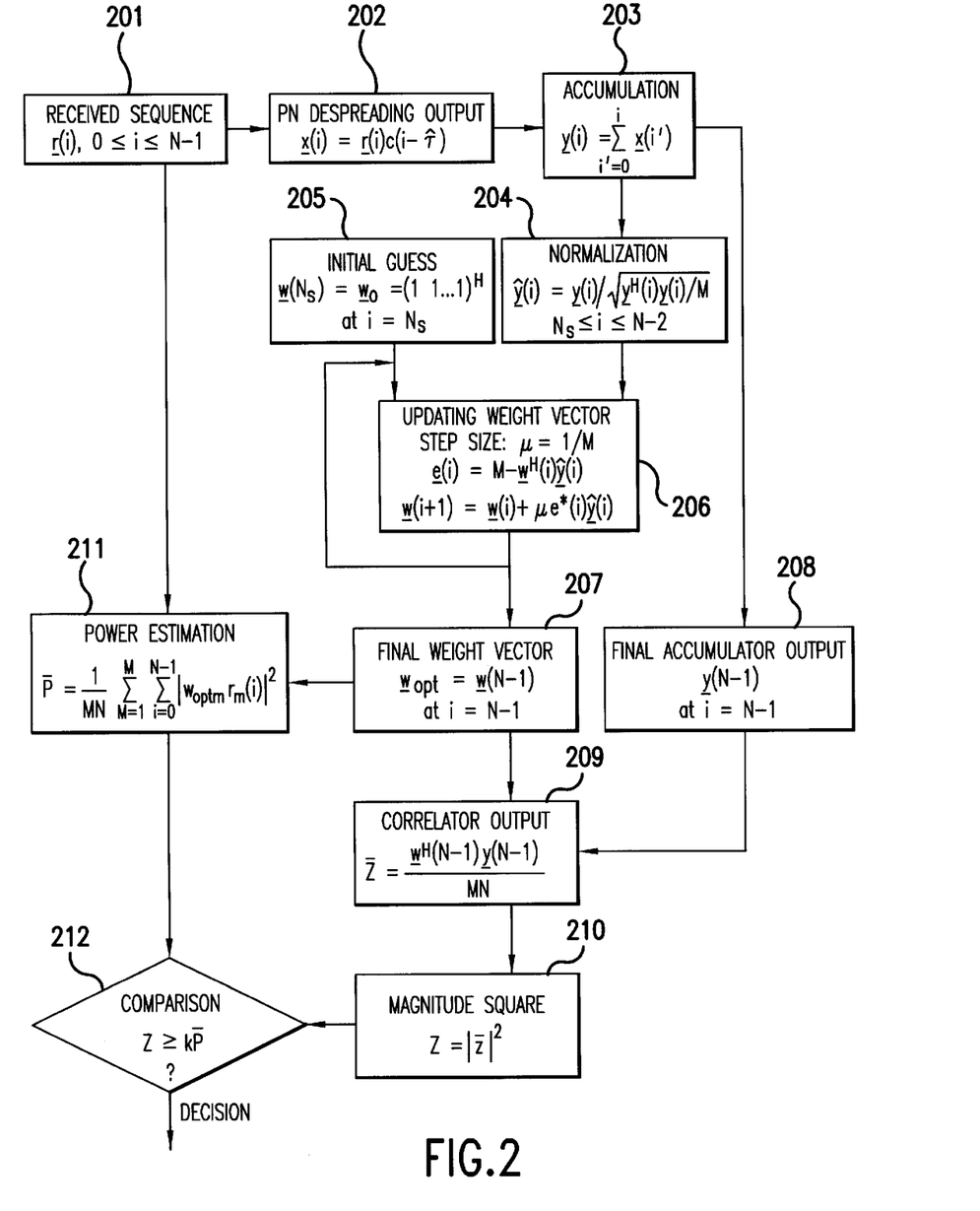
FIG. 2 shows a flow chart of the proposed PN code acquisition scheme for a DS-CDMA system configured in accordance with one embodiment of the present invention.

FIG. 2 shows the corresponding flow chart of the proposed PN code acquisition system with the present invention. All the vectors in FIG. 2 have M elements, where M is the number of antenna elements. First, we start from the received sequence $\underline{r}(i)$ in block 201, which is formed by the output of the chip samplers 104 in FIG. 1, where i is the time index. Next, $\underline{x}(i)$ (the despread signal) in block 202 is formed by the output of the correlators 105. Next, the $\underline{y}(i)$ in block 203 is formed from the accumulator 106 output. The output of block 203 is then used in block 204 and block 208. At $i=N_s$ the adaptive beamformer 107 starts updating the weight vector $\underline{w}(i)$. $\underline{W}_0=(1\ 1\ \ldots\ 1)^H$ in block 205 is the initial weight vector at $i=N_s$. In block 204, the input to the adaptive beamformer 107 is $\hat{\underline{y}}(i)$, which is the normalized $y(i)$. The output of block 204 is used in updating the weight vector block 206. Block 206 shows the LMS algorithm for the adaptive beamformer 107. As shown in block 206, an intermediate value $\underline{w}(i)$ of the weight vector is formed at each update, which is then used at the subsequent update. The updated weight vector from block 206 is output to block 207. At $i=N-1$, the final weight vector shown in block 207 is multiplied with the final accumulator output $\underline{y}(N-1)$ shown in block 208 to generate the spatial correlation output 109 $\bar{z}$ in block 209. Block 210 calculates the magnitude square of $\bar{z}$ using the output of block 209 to get the decision variable Z 110, which is output to blocks 212. The power is estimated at block 211 utilizing the outputs of block 201 and 207. In block 212, Z is compared with the threshold scaled by the adaptive threshold setting circuit 108 output shown in block 211 and then the decision as to whether to declare PN code acquisition is made.

To verify the theoretical results, simulation has been done with the PN code acquisition scheme configured in accordance with one embodiment of the present invention. The simulation parameters are described as the following. $P_f=0.01$, the number of antenna elements M=1, 3, and 5, $N_s=192$, N=256, bit rate=9600 bits/second, chip rate $=1.2288 \times 10^6$ chips/second, and penalty factor $K_p=256$ were assumed. The fixed reference threshold k was chosen to guarantee $P_f$ to be equal to 0.01 for the adaptive threshold case. k=0.0179 was chosen for one element case; k=0.0108 for three element case; and k=0.0089 for five elements case. The fixed reference $I_0$ was chosen to make $P_f$ in equation (59) to be equal to 0.01 at $E_b/I_o=-15$ dB for the nonadaptive threshold case. One sample per chip was taken for simulation. Jakes' fading model was used for fading environment. The average fading channel power $\sigma_f^2=1$, velocity v=80 miles/hour and carrier frequency $f_c=900$ MHz were chosen for fading case. Spreading factor 128 and $E_b/I_o=128E_c/I_o$ were used where $E_b$ is information bit energy. The simulation parameters are summarized in Table 1.

TABLE 1

Simulation Parameters

| Description | | Parameter Value |
|---|---|---|
| False Alarm Probability | | $P_f = 0.01$ |
| Observation Interval | | N = 256 |
| Starting Time Index of Updating Weight Vector | | $N_s$ = 192 |
| Number of Samples per Chip | | 1 sample/chip |
| Penalty Factor | | $K_p$ = 256 |
| Bit Rate | | 9600 bits/second |
| Chip Rate | | $1.2288 \times 10^6$ chips/second |
| Spreading Factor | | 128 |
| Bit-Energy-to-Interference Power Spectral Density Ratio | | $E_b/I_o$ = 128 $E_c/I_o$ |
| Carrier Frequency | | $f_c$ = 900 MHz |
| Mobile User Velocity | | v = 80 miles/hour |
| Average Fading Channel Power | | $\sigma_f^2$ = 1 |
| Fixed Reference Threshold k[1] | M = 1 | k = 0.0179 |
| | M = 3 | k = 0.0108 |
| | M = 5 | k = 0.089 |
| Interference Power Spectral Density Ratio | M = 1 | $I_0$ = 0.9947 |
| | M = 3 | $I_0$ = 0.9981 |
| | M = 5 | $I_0$ = 0.9987 |

[1]k is chosen such that the PN code acquisition yield a given $P_f$ = 0.01 for the adaptive threshold case. When $\bar{P}$ = 1, k becomes the fixed threshold for the nonadaptive threshold case. That is why k is called the fixed reference threshold.

Figure 3:
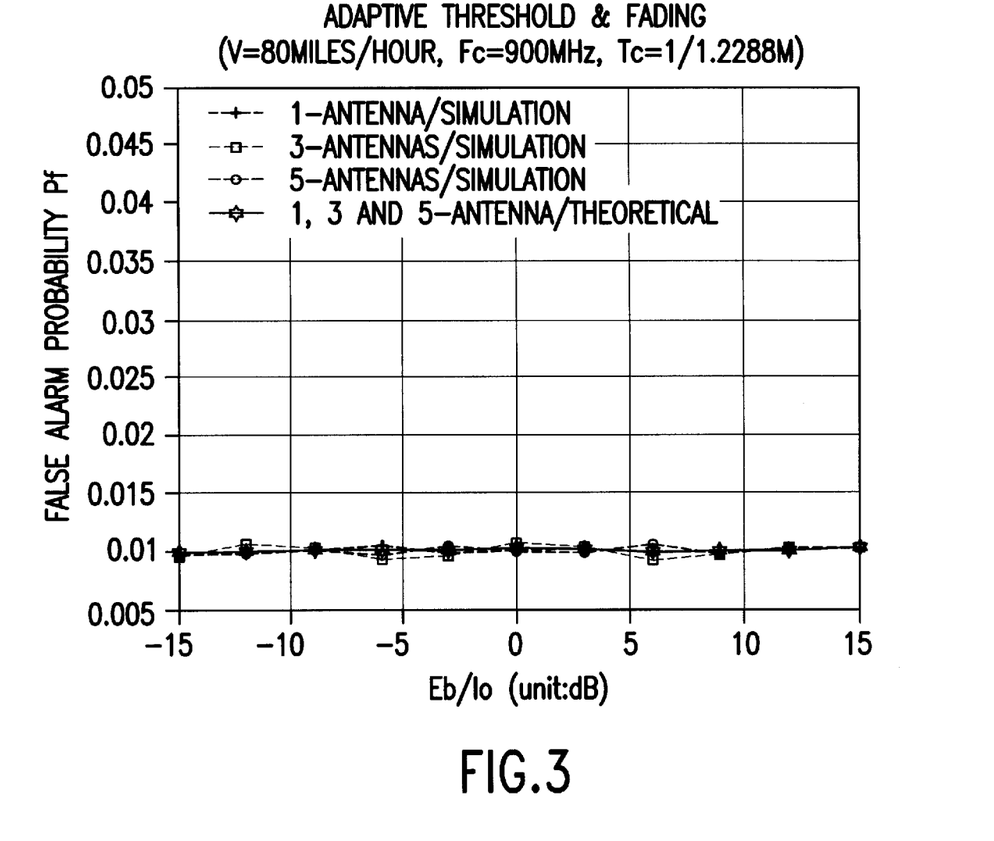
FIG. 3 shows the theoretical and simulation false alarm probabilities $P_f$ versus bit-energy-to-interference power spectral density ratio $E_b/I_o$ in dB for M=1, 3, and 5 elements cases under a fading environment, indicating that the PN code acquisition scheme configured in accordance with one embodiment of the present invention is robust against the received signal power variations.

FIG. 3 shows the theoretical and simulation false alarm probabilities $P_f$ versus bit-energy-to-interference power spectral density ratio $E_b/I_o$ in dB for M=1, 3, and 5 cases under fading environment with a PN code acquisition scheme configured in accordance with one embodiment of the present invention. The simulation $P_f$ for M=1, 3, and 5 cases fluctuate very slightly around the theoretical $P_f=0.01$. And the simulation $P_f$'s do not increase as $E_b/I_o$ increases while $P_f$ does for a nonadaptive threshold scheme. This means the present invention can approximately achieve CFAR and is robust against the received signal power variations.

Figure 4:
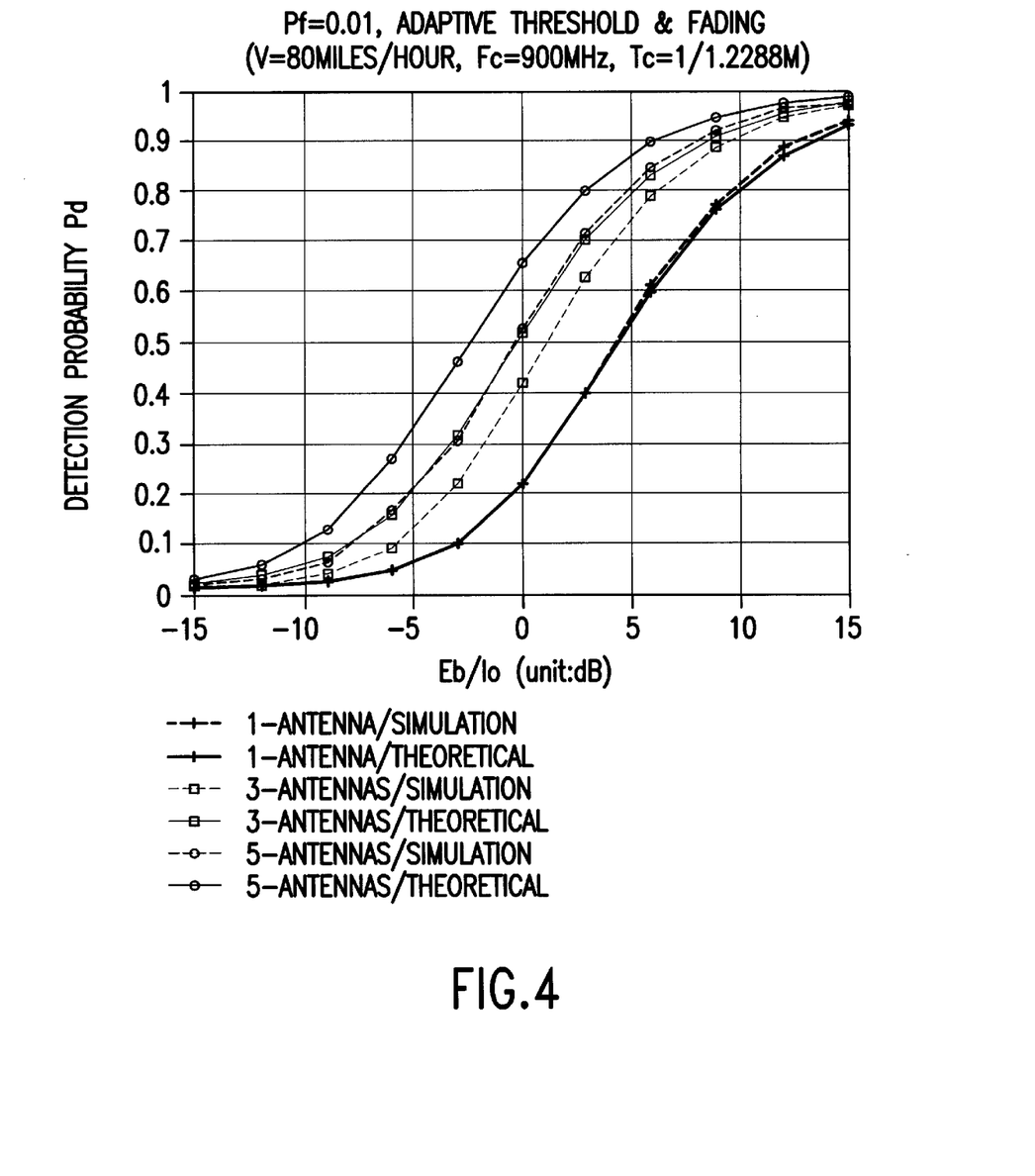
FIG. 4 shows the theoretical and simulation detection probabilities $P_d$ versus bit-energy-to-interference power spectral density ratio $E_b/I_o$ in dB for M=1, 3, and 5 elements under fading environment, indicating that the PN code acquisition scheme configured in accordance with one embodiment of the present invention improves detection probability $P_d$ significantly.

FIG. 4 shows the theoretical and simulation detection probabilities $P_d$ versus bit-energy-to-interference power spectral density ratio $E_b/I_o$ in dB for M=1, 3, and 5 under fading environment, with a PN code acquisition scheme configured in accordance with one embodiment of the present invention. At $P_d=0.8$, M=3 and 5 case simulation results show 3.5 dB and 4.9 dB improvement in SINR, respectively, compared with M=1 case.

Figure 5:
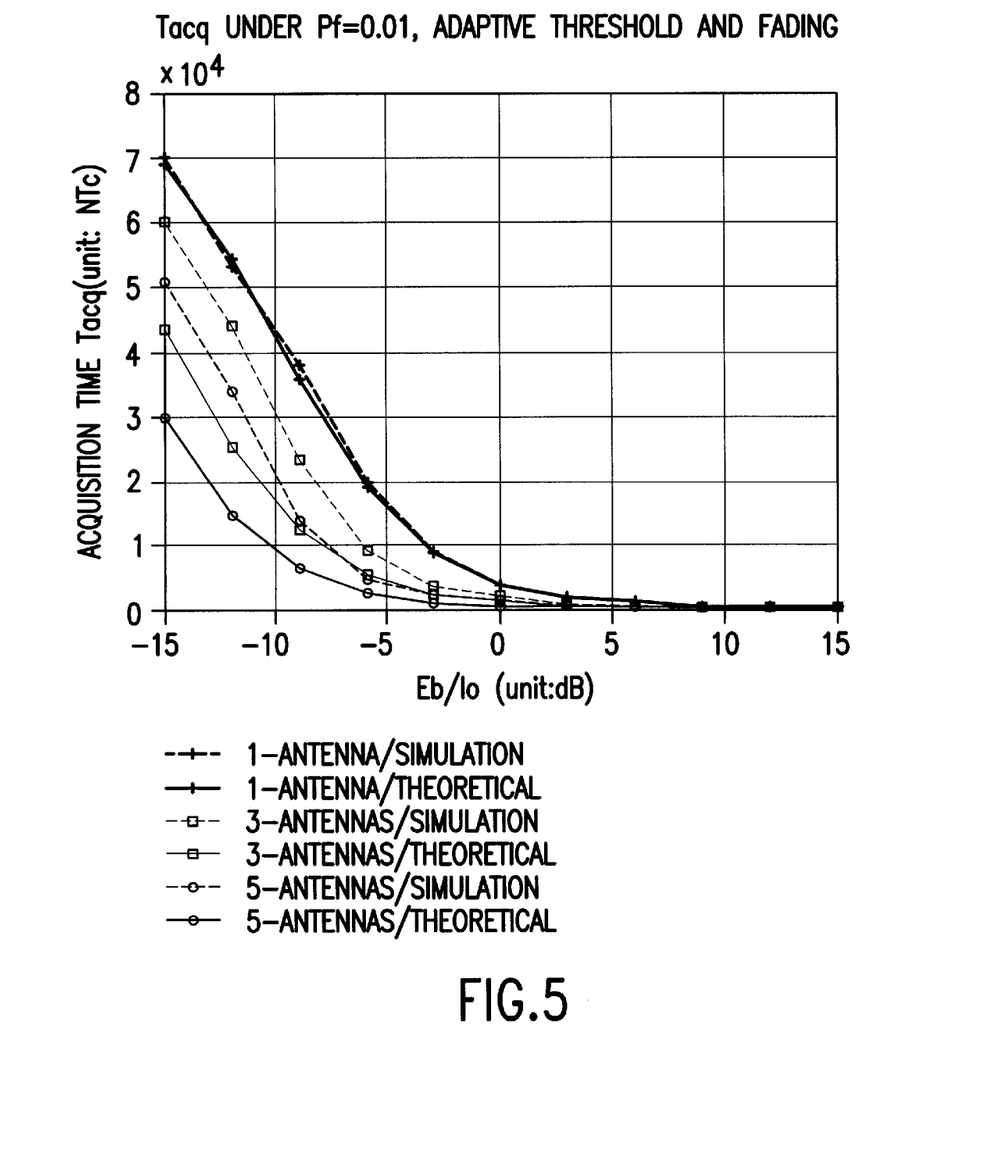
FIG. 5 shows the theoretical and simulation average acquisition time $T_{acq}$ versus bit-energy-to-interference power spectral density ratio $E_b/I_o$ in dB for M=1, 3, and 5 elements under fading environment, indicating that the PN code acquisition scheme configured in accordance with one embodiment of the present invention improves average acquisition time $T_{acq}$ significantly.

FIG. 5 shows the theoretical and simulation average acquisition time $T_{acq}$ versus bit-energy-to-interference power spectral density ratio $E_b/I_o$ in dB for M=1, 3, and 5 under fading environment with a PN code acquisition scheme configured in accordance with one embodiment of the present invention. At $T_{acq}=10^4 NT_c$, M=3 and 5 case can improve 2.7 dB and 4.2 dB in SINR, respectively, compared with M=1 case. Therefore, when a base station employs the present invention, a random access user may transmit signal with smaller power than the single antenna case. Interference can be reduced and capacity of the system can be increased. Or at $E_b/I_0=-10$ dB, the PN code acquisition time with the proposed PN code acquisition scheme of M=5 elements can be significantly shortened, e.g., 210%, compared to the existing PN code acquisition scheme of a single element in "Adachi et al." We observe that simulation results are different from the theoretical results when M≧2. This is because the smart antenna weight vector does not perfectly match with the array response vector of the desired user signal's DOA while perfect weight vector was assumed for the theoretical results.

In conclusion, a PN code acquisition scheme using a smart antenna and an adaptive threshold setting of the present invention is robust against the received signal power variations and could improve performance 210% in PN code acquisition time or at least 4.5 dB in SINR to achieve the same detection probability when M=5 elements are used.

Those of skill in the art will readily appreciate that various alternative designs and embodiments for practicing the invention are possible. For example, while a single dwell has been described above, the present invention is equally applicable to other PN searches, e.g., double dwell, serial and complete searches. Additionally, those of skill in the art will recognize that the various devices described herein (e.g., accumulators) can be implemented in hardware and/or software. It is therefore to be understood that within the scope of the appended claims, the invention may be practiced otherwise than as specifically described herein.

What is claimed is:

1. A method for acquiring a pseudo-noise (PN) code comprising the steps of:

accumulating despread samples obtained from a plurality of elements in a smart antenna array at a sampling rate, the samples being despread using a PN code shifted by a trial PN code phase error, separate accumulations being maintained for each element;

updating an antenna array weight vector based on the accumulated despread samples;

forming a spatially correlated signal by weighting the accumulated despread samples from each element with a corresponding weight from the updated antenna array weight vector and combining the weighted samples;

comparing the spatially correlated signal to a threshold to determine whether PN code acquisition has been achieved; and selecting a new trial PN code phase error and repeating the accumulating, updating, forming and comparing steps if PN code acquisition has not been achieved.

2. The method of claim 1, wherein the sampling rate is equal to a chip rate.

3. The method of claim 1, wherein the sampling rate is faster than a chip rate.

4. The method of claim 1, wherein the updating step is performed using a least mean square algorithm.

5. The method of claim 1, wherein the updating step is performed using a normalized least mean square algorithm.

6. The method of claim 1, wherein the threshold is fixed.

7. The method of claim 1, wherein the threshold is adaptive.

8. The method of claim 7, wherein the adaptive threshold is determined based upon an estimated power.

9. The method of claim 8, wherein the process of estimating the power includes the steps of accumulating received signals that have not been despread from each element to form a plurality of spread accumulated signals, weighting each spread accumulated signal from each element by a corresponding weight from the updated antenna array weight vector, and combining the weighted spread accumulated signals.

10. The method of claim 9, further comprising the step of averaging the combined weighted spread accumulated signal.

11. The method of claim 1, wherein the accumulating step is performed for a number of samples that is one less than the number of samples in an observation period.

12. The method of claim 1, wherein the updating step is performed at a rate approximately equal to the sampling rate.

13. The method of claim 12, wherein the updating step is performed for a number of samples that is two less than the number of samples in an observation period.

14. The method of claim 12, wherein the updating step is performed for a number of samples that is less than two less than the number of samples in an observation period.

15. The method of claim 14, wherein the number of samples for which the updating step is performed is based upon a convergence rate of an algorithm used to update the antenna array weight vector.

16. The method of claim 1, wherein the accumulating, updating, forming, comparing and selecting steps are performed at a base station.

17. The method of claim 1, wherein the accumulating, updating, forming, comparing and selecting steps are performed at a mobile unit.

18. The method of claim 16, wherein the base station forms part of a code division multiple access system.

19. The method of claim 16, wherein the base station forms part of a direct sequence code division multiple access system.

20. The method of claim 17, wherein the mobile unit forms part of a code division multiple access system.

21. The method of claim 17, wherein the mobile unit forms part of a direct sequence code division multiple access system.

22. The method of claim 1, wherein the accumulating, updating, forming, comparing and selecting steps are performed for a reverse link.

23. The method of claim 1, wherein the accumulating, updating, forming, comparing and selecting steps are performed for a forward link.

24. The method of claim 1, wherein an observation period during which samples are accumulated is constant for each iteration of the accumulating step.

25. The method of claim 1, wherein an observation period during which samples are accumulated varies between a short observation period and a long observation period.

26. The method of claim 1, wherein an observation period during which samples are accumulated varies between at least three periods.

27. A method for calculating a threshold used to determine whether PN code acquisition has occurred, the method comprising the steps of:

accumulating received signals that have not been despread from each element of a plurality of elements in an antenna array to form a plurality of separately maintained unspread accumulated signals;

weighting each unspread accumulated signal from each element by a corresponding weight from an updated antenna array weight vector; and combining the weighted unspread accumulated signals.

28. The method of claim 27, further comprising the step of averaging the combined weighted unspread accumulated signals.

29. The method of claim 28, further comprising the step of repeating the accumulating, weighting, combining and averaging steps during each observation period in which the threshold is used.

30. An apparatus for acquiring a pseudo-noise (PN) code comprising:

a plurality of chip samplers, each chip sampler being connectable to receive a signal from a corresponding element of an antenna array, the antenna array having a plurality of elements;

a plurality of despreaders, each despreader being connected to receive samples from a corresponding chip sampler;

a plurality of accumulators, each accumulator being connected to receive despread samples from a corresponding despreader;

an adaptive beamformer, the beamformer being connected to receive accumulated, despread samples from the accumulators, the beamformer outputting an updated antenna array weight vector; and a PN correlation searcher, the correlation searcher being connected to receive the updated antenna array vector from the beamformer and an accumulated despread sample from each of the accumulators, the correlation searcher being configured to weight accumulated samples from the accumulators by corresponding weights from the updated antenna array vector to form a spatially correlated signal, the correlation searcher further being configured to compare the spatially correlated signal to a threshold to determine whether PN code acquisition has been achieved.

31. The apparatus of claim 30, further comprising an adaptive threshold circuit connected to supply the correlation searcher with the threshold.

32. The apparatus of claim 31, wherein the adaptive threshold circuit comprises an average power calculator circuit.

33. The apparatus of claim 31, wherein the adaptive threshold circuit comprises:

a plurality of second accumulators, each of the second accumulators being connected to receive a square of an output of a corresponding chip sampler;

a plurality of multipliers, each multiplier being connected to a respective second accumulator to receive a final accumulated value, each multiplier further being configured to weight the final accumulated value by a weight based on a corresponding weight from the updated antenna array weight vector; and an adder, the adder being connected to each of the multipliers to form a sum of outputs from the multipliers.

34. The apparatus of claim 30, wherein the threshold is fixed.

35. The apparatus of claim 30, wherein the chip samplers are configured to sample at a chip rate.

36. The apparatus of claim 30, wherein the chip sampler are configured to sample at a rate faster than a chip rate.

37. The apparatus of claim 30, wherein the adaptive beamformer employs a least mean square algorithm.

38. The apparatus of claim 30, wherein the adaptive beamformer employs a normalized least mean square algorithm.

39. The apparatus of claim 30, wherein the adaptive beamformer updates the antenna array weight vector at a rate approximately equal to the sample rate.

40. The apparatus of claim 39, wherein the adaptive beamformer is configured to start updating the antenna array weight vector at a sample that is selected based on an estimated number of samples required for the adaptive beamformer to converge and a safety factor.

41. The apparatus of claim 40, wherein the adaptive beamformer is configured to stop updating the antenna array weight vector at a second to last sample in an observation period.

42. The apparatus of claim 30, further comprising the antenna array wherein each chip sampler is connected to the corresponding element of the antenna array.

43. The apparatus of claim 42, wherein the antenna is located at a base station.

44. The apparatus of claim 42, wherein the base station forms part of a code division multiple access system.

45. The apparatus of claim 42, wherein the base station forms part of a direct sequence code division multiple access system.

46. The apparatus of claim 42, wherein the antenna is located at a mobile unit.

47. The apparatus of claim 46, wherein the mobile unit forms part of a code division multiple access system.

48. The apparatus of claim 46, wherein the mobile unit forms part of a direct sequence code division multiple access system.

49. The apparatus of claim 30, wherein the correlation searcher is configured to perform a simple search.

50. The apparatus of claim 30, wherein the correlation searcher is configured to perform a complete search.

51. The apparatus of claim 30, wherein the correlation searcher is configured to perform a serial search.

52. The apparatus of claim 30, wherein the correlation searcher is configured to perform a single dwell search.

53. The apparatus of claim 30, wherein the correlation searcher is configured to perform a dual dwell search.

54. The apparatus of claim 30, wherein the correlation searcher is configured to perform a multiple dwell search.

55. The apparatus of claim 30, wherein a spacing between adjacent elements in the array is approximately equal to one half of a carrier wavelength.

56. An apparatus for calculating a threshold used to determine whether PN code acquisition has occurred, the apparatus comprising:

a plurality of second accumulators, each of the second accumulators being connected to receive a square of an output from a corresponding chip sampler, the chip sampler being connected to receive a signal from a corresponding element in an antenna array;

a plurality of multipliers, each multiplier being connected to a respective accumulator to receive a final accumulated value, each multiplier further being configured to weight the final accumulated value by a weight based on a corresponding weight from the updated antenna array weight vector; and an adder, the adder being connected to each of the multipliers to form a sum of outputs from the multipliers.

* * * * *